United States Patent
Meissner et al.

(10) Patent No.: US 8,882,866 B2
(45) Date of Patent: Nov. 11, 2014

(54) PRIMARY REFORMER FOR REDUCED NITRIC OXIDE FORMATION

(75) Inventors: Oliver Meissner, Gladbeck (DE); Thilo Von Trotha, Selm (DE)

(73) Assignee: ThyssenKrupp Industrial Solutions AG, Essen (DE)

(*) Notice: Subject to any disclaimer, the term of this patent is extended or adjusted under 35 U.S.C. 154(b) by 0 days.

(21) Appl. No.: 13/261,055

(22) PCT Filed: Jun. 24, 2010

(86) PCT No.: PCT/EP2010/003793
§ 371 (c)(1),
(2), (4) Date: Feb. 6, 2012

(87) PCT Pub. No.: WO2010/149361
PCT Pub. Date: Dec. 29, 2010

(65) Prior Publication Data
US 2012/0126177 A1 May 24, 2012

(30) Foreign Application Priority Data

Jun. 24, 2009 (DE) .......................... 10 2009 030 480
Jun. 21, 2010 (DE) .......................... 10 2010 024 539

(51) Int. Cl.
| | | |
|---|---|---|
| C01B 6/24 | (2006.01) | |
| C10J 3/00 | (2006.01) | |
| B01J 8/06 | (2006.01) | |
| C01B 3/38 | (2006.01) | |

(52) U.S. Cl.
CPC ......... C01B 3/384 (2013.01); *C01B 2203/0816* (2013.01); *B01J 8/062* (2013.01); *B01J 2208/0053* (2013.01); *B01J 2208/00504* (2013.01); *C01B 2203/0233* (2013.01)
USPC ............................ 48/61; 423/644; 423/648.1

(58) Field of Classification Search
USPC .................................... 48/61; 423/644, 648.1
See application file for complete search history.

(56) References Cited

U.S. PATENT DOCUMENTS 4,065,483 A * 12/1977 Pinto .............................. 518/704
4,568,583 A * 2/1986 Twigg .......................... 122/44.2
(Continued)

FOREIGN PATENT DOCUMENTS

DE  10 2007 019 830 B3   7/2008
EP       0 643 020 A2      3/1995
(Continued)

OTHER PUBLICATIONS

Arthur L. Kohl and Richard B. Nielsen; "Gas Purification"; Gulf Publishing Company; Houston, Texas, Dec. 12, 1997; pp. 884-887; Fifth Edition; XP040425485.

*Primary Examiner* — Matthew Merkling
(74) *Attorney, Agent, or Firm* — ThyssenKrupp North America, Inc.

(57) ABSTRACT

A method is disclosed for catalytic primary reformation of hydrocarbons with steam at elevated pressure by means of a split tube reactor and a firing chamber. In the split tube system which can use a catalyst material, hydrocarbons to be reformed are converted by water steam to synthesis gas. The split tube system is heated by a plurality of firing facilities between the split tubes which include a plurality of burners arranged in series, the burners generating mainly downwardly directed flames. The relevant firing facilities are supplied with fuel and air, with the air being withdrawn from the relevant feeders. The flue gas thus evolving passes through the firing chamber from top to bottom and enters in the lower area of the firing chamber into horizontally arranged ceramic flue gas tunnels extending in parallel to each other and perpendicular to the vertical split tubes and being allocated to one firing facility each. The flue gas enters through apertures in the lateral walls of the flue gas tunnels. The flue gas at the exit of the firing chamber is passed into heat recovery devices. In each flue gas tunnel an additional gas is fed into the tunnel's front side, in flue gas flow direction, wherein the gas containing oxygen and a non-combustible gas, so that the additional gas passes the flue gas tunnels over the entire length of the firing chamber. The volume of the additional gas passed into the flue gas tunnels is regulated.

6 Claims, 5 Drawing Sheets

(56) References Cited

U.S. PATENT DOCUMENTS

| | | | |
|---|---|---|---|
| 5,417,731 A | 5/1995 | LeBlanc et al. | |
| 7,833,009 B2 | 11/2010 | Joshi et al. | |
| 7,837,974 B2 | 11/2010 | Hederer et al. | |
| 2008/0290322 A1* | 11/2008 | Hederer et al. | 252/373 |
| 2010/0193741 A1 | 8/2010 | Meissner et al. | |

FOREIGN PATENT DOCUMENTS

| | | |
|---|---|---|
| EP | 1 634 856 A1 | 3/2006 |
| WO | WO 2005/018793 A1 | 3/2005 |
| WO | WO 2006/119812 A1 | 11/2006 |
| WO | WO 2008/131832 A1 | 11/2008 |

* cited by examiner

PRIMARY REFORMER FOR REDUCED NITRIC OXIDE FORMATION

BACKGROUND OF THE INVENTION

The invention relates to a top-fired primary reformer as well as to a method for catalytic reformation of hydrocarbons with steam under elevated pressure to produce synthesis gas. Synthesis gas of this kind, for example, serves to produce ammonia, hydrogen, and methanol. Accordingly, the primary reformer is so designed and constructed that it counteracts a formation of detrimental nitric oxides in flue gas.

Reactors for catalytic reformation of hydrocarbons with steam have been known for a long time and are known in a plurality of layouts. For large-capacity plants, a design has paved its way in which a top-fired box-type furnace with upright standing reaction tubes and/or split tubes is implemented. The split tubes are arranged in series. The tubes are passed through from top to bottom by process gas which forms the input gas. The input gas is subjected to a so-called splitting process.

The gas outlet temperatures usually range at 850° C. and beyond. In the lower area—inside or outside the furnace—the process gas is collected in so-called outlet collectors. Burners firing vertically downwards are arranged in the "lanes" lying between the tube rows. This area is designated as furnace box. On average, the temperatures in the furnace box range between 1000 and 1250° C. For thermal insulation and for protection from high temperatures prevailing due to heating, the furnace walls are lined with a protective refractory lining.

In its lower area, the furnace chamber in which the firing devices are arranged has a chamber for collection of flue gases as well as a multitude of mainly horizontally arranged bricked tunnels extending in parallel to each other and perpendicular to the vertical tubes. Generated flue gas streams from top to bottom through the furnace and is discharged through those tunnels which have apertures at their sides.

WO2005/018793 A1 describes a typical furnace system and a method for catalytic reformation of hydrocarbons with steam at elevated pressure to obtain synthesis gas. A special configuration of the external walls of the tunnels is applied in order to achieve a better homogenization of the flue gas flow and to obtain a more uniform temperature distribution of the furnace firing. WO2005/018793 A1 describes a typical furnace system and a method for catalytic reformation of hydrocarbons with steam to obtain synthesis gas by supplying oxygen to adapt the stoichiometry and with a special pore burner installed further downstream to avoid formation of soot.

All the reforming systems described hereinabove have in common that a firing device comprised of a multitude of burners arranged between process managing reaction tubes heats the oven chamber with the reforming tubes leading through the furnace chamber. Burners serving for firing the oven chamber are usually supplied with fuel gas and air through separate channels. The supply of fuel gas into the burner chamber is accomplished separately from the supply of air. The penetration of gas feeders into the burner chamber is accomplished through the refractory furnace lining or immediately in front of it. Accordingly, the ratio between fuel gas and air for the burners is controlled by a butterfly flap or a similarly designed facility for the adjustment of the gas flow of the air supply. The burner firing and thus the furnace temperature can be controlled via this facility.

The ratio between oxygen and fuel gas can technically be described by the so-called Lambda ($\lambda$) value. On applying a stoichiometrical mol ratio of oxygen versus fuel gas, one obtains a Lambda value of 1.0. On using an oxygen portion which is lower in the stoichiometrical combustion ratio, one obtains a Lambda value which is lower than 1.0. Applying an oxygen portion which is higher in the stoichiometrical combustion ratio, one obtains a Lambda value which is higher than 1.0. Therefore, combustion is optimal if the Lambda value amounts to 1.0. With conventional designs, one obtains Lambda values at the individual burners which fluctuate due to operation and which may have temporarily higher values.

This takes an adverse effect on the combustion process. Its consequence may be a higher total consumption of fuel gas relative to the turnover of the reforming process. With a change of the fuel material, the supply of air can hardly be adjusted to the modified stoichiometry. Consequently, it may temporarily entail an unintentional increase in the flame temperature and, as a result of an increased inflow of air, it may involve an intensified formation of nitric oxides of the $NO_x$ type. As pollutants in the atmosphere, nitric oxides contribute to acid rain.

It is also known that the nitric oxide contents $NO_x$ of a waste gas decreases substantially when applying a more favorable Lambda value at the burner brick. And it is well known that the nitric oxide contents $NO_x$ of a waste gas decreases substantially when adjusting and setting a lower flame temperature. This may be gathered from the relevant and well known literature. To give an example, reference is made here to the teaching "The John Zink Combustion Handbook", C. E. Baukel Jr., CRC-Press, London New York, 2001. Therefore, an optimized adjustment and setting of the air vs. fuel gas ratio at the burners and an optimal control of combustion with regard to the adjustment and setting of an optimal Lambda value are of essential importance in the reduction of nitric oxides in synthesis gas production.

With certain operating conditions, such as in partial load mode, prior art designs moreover pose a problem in that the volume of evolving flue gas must be raised by increasing the air surplus in order to adapt heat transfer in the waste heat section downstream of the reformer to the operational requirements of the overall plant. An increased air surplus takes a negative effect on the formation of nitric oxides in flue gas.

WO2008/131832 A1 describes a reactor for catalytic reformation of hydrocarbons with steam at elevated pressure, said reactor comprising a reaction chamber and a firing chamber, said reaction chamber comprised of a plurality of vertical tubes arranged in rows and suitable for being filled with a catalyst, and having facilities for feeding of hydrocarbons and steam to be reformed to the reaction chamber, and furthermore comprising facilities for discharge of reformed synthesis gas from the reaction chamber, and furthermore comprising a plurality of firing facilities in the upper area of the firing chamber, said firing facilities being able to generate mainly downwardly directed flames that are suitable to heat the afore-mentioned reaction tubes, with the tube feeding air to the burner being equipped with a facility for adjusting and setting the air flow, and there being a secondary air feeder mounted additionally to this tube and branching-off from it and configured in various layouts and having an independently controllable facility for adjusting and setting the air flow and also feeding air to the firing facility so that a more favorable ratio of fuel gas versus air results at the burners so as to be able to achieve a waste gas poor in nitric oxides.

This configuration bears a disadvantage in that the burners proper have to be of a very sophisticated configuration in order to equip them with the a.m. secondary inlet ducts for air.

BRIEF SUMMARY OF THE INVENTION

Now, therefore, within the context of the set of problems as outlined hereinabove, it is the object of the present invention to propose an improved design of the primary reformer that is no longer afflicted with the disadvantages of the burner configuration described hereinabove and which is suitable to ensure optimal Lambda values so that the formation of detrimental nitric oxides can be reduced substantially. Moreover, in case of certain operating conditions such as those encountered in case of a partial load operation of the primary reformer, it is also intended to ensure an optimal thermal exploitation of the heat contained in the flue gas.

The invention solves this task by a reactor for catalytic primary reformation of hydrocarbons with steam at elevated pressure, said device comprised of a split tube system and a firing chamber, wherein the split tube system as reaction chamber is comprised of a plurality of vertical tubes arranged in series and suitable for catalyst filling, and comprised of facilities for feeding of hydrocarbons to be reformed and water steam to the reaction chamber as well as comprised of facilities for discharging of reformed synthesis gases from the reaction chamber, and wherein the upper area of the firing chamber comprises a plurality of firing facilities
arranged in parallel to each other each between the split tubes and a plurality of burners arranged in series, with the burners being able to generate mainly downwardly directed flames
that are suitable to heat the afore-mentioned tubes, and wherein the relevant firing facilities are supplied with fuel gas and air via feeder devices, with the air being withdrawn from the relevant feeders, and wherein the firing chamber in its lower area is comprised of a plurality of mainly horizontally arranged flue gas tunnels extending in parallel to each other and perpendicular to the vertical split tubes, said flue gas tunnels being made of ceramic materials and destined for the discharge of flue gases through apertures in the lateral walls of the flue gas tunnels,
said flue gas tunnels being allocated to one row of firing facilities each, and wherein
the flue gas tunnels at the exit from the firing chamber terminate in devices which are equipped with heat exchangers for heat recovery, and wherein
every single flue gas tunnel is equipped with means for feeding an additional gas at its front side, in flue gas flow direction, wherein the gas containing oxygen and a non-combustible gas, so that the additional gas passes the flue gas tunnels over the entire length of the firing chamber,
every single means for feeding the additional gas being equipped with devices for regulating the gas current.

In a preferred embodiment of the present invention, a branch of the stream of air, which is preheated for combustion purposes, is connected to the means which are for feeding the additional gas into the flue gas tunnels.

In a further preferred embodiment of the present invention a pressurization means is provided for additional gas drawn of from the stream of air which is preheated for combustion purposes.

The invention also solves this task by a method for catalytic primary reformation of hydrocarbons with steam at elevated pressure by means of the inventive reactor as described above having a split tube system and a firing chamber, wherein in the split tube system which can be filled with a catalyst material, hydrocarbons to be reformed are converted by means of water steam to synthesis gas, and wherein the split tube system is heated by a plurality of firing facilities each arranged between the split tubes and which are comprised of a plurality of burners arranged in series, with the burners being able to generate mainly downwardly directed flames, and wherein the relevant firing facilities are supplied with fuel gas and air, with the air being withdrawn from the relevant feeders, and wherein the flue gas thus evolving passes through the firing chamber from top to bottom and enters in the lower area of the firing chamber into mainly horizontally arranged flue gas tunnels extending in parallel to each other and perpendicular to the vertical split tubes and being allocated to one firing facility each, said flue gas tunnels being made of ceramic material, and said flue gas entering through apertures in the lateral walls of the flue gas tunnels, and wherein the flue gas at the exit of the firing chamber is passed into devices that are utilized for heat recovery, and wherein in every single flue gas tunnel an additional gas is fed through means for feeding into the tunnel's front side, in flue gas flow direction, wherein the gas containing oxygen and a non-combustible gas, so that the additional gas passes the flue gas tunnels over the entire length of the firing chamber, with the volume of the additional gas passed into the flue gas tunnels being regulated.

In an embodiment of the present invention air is used as additional gas. Further it is possible to use contaminated and oxygen containing gas streams deriving from an industrial site. This would lead to a destruction of contaminating components. Gas streams of that nature can be admixed to the additional gas as well.

The volume of the partial stream of air passed into the flue gas tunnels is expediently adjusted and set via flaps or valves.

BRIEF DESCRIPTION OF THE DRAWINGS

The invention is hereinafter explained in detail on the basis of three figures, where.

DETAILED DESCRIPTION OF THE INVENTION

Figure 1:
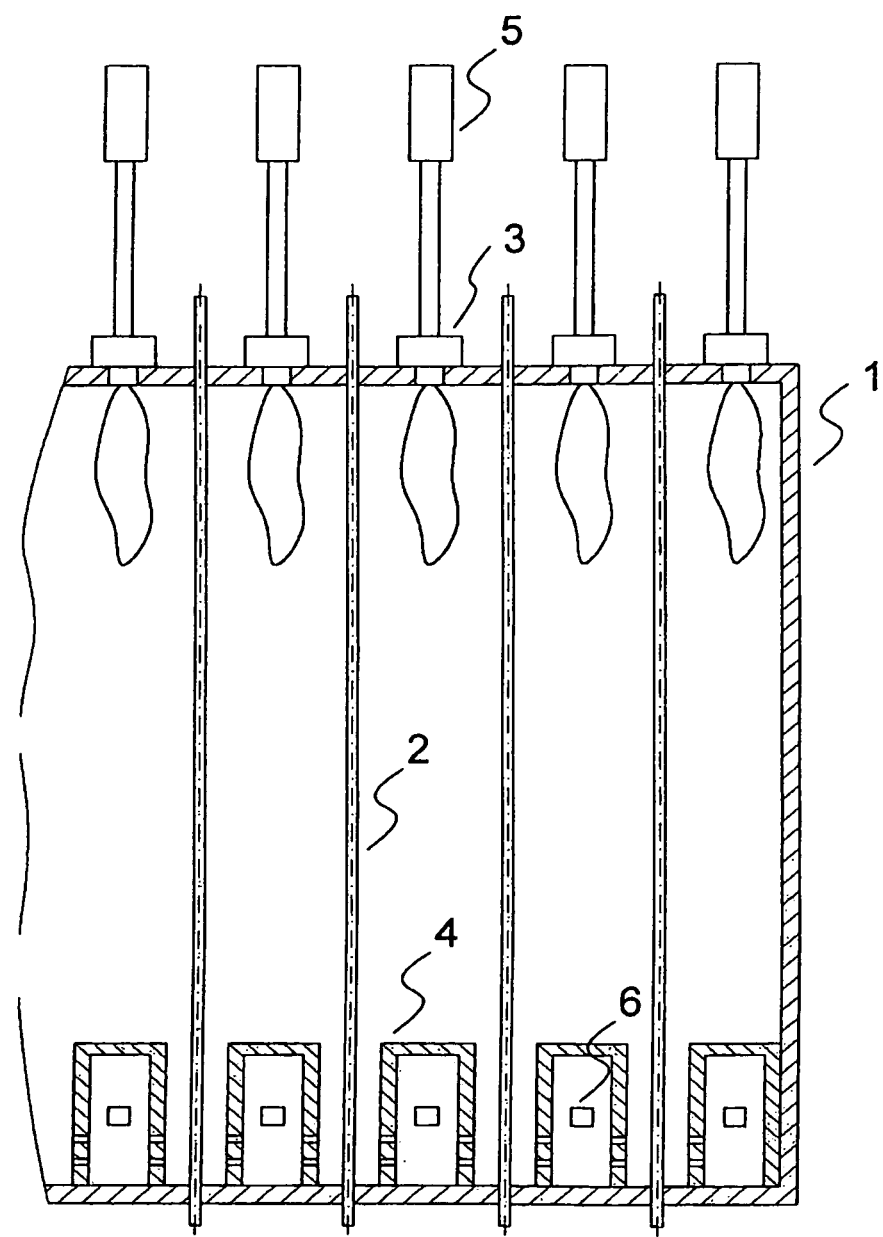
FIG. 1: shows a cross-section of an inventive embodiment of a primary reformer

FIG. 1 illustrates a section of a section of an inventive exemplary embodiment of a reactor for catalytic primary reforming comprised of a firing chamber 1 and a split tube system composed of a plurality of split tubes 2 which are arranged in series. During operation as intended, these split tubes 2 are filled with catalyst material and are passed through by feedstock gas and/or synthesis gas. In the top area of firing chamber 1, a plurality of burners 3 is arranged in series to fire the split tubes during operation as intended. Located in the lower area of firing chamber 1 are flue gas tunnels 4 for flue gas discharge, there being one flue gas tunnel 4 being allocated to each burner row. In their lateral walls, these flue gas tunnels 4 have apertures for the introduction of flue gases generated by burners 3. Each of the burners 3 is connected to feeder devices for air 5 and fuel gas (not shown here), with it being possible to regulate (not shown here) the feed of the air volume to each burner 3. Up to this point, the embodiment illustrated in FIG. 1 represents prior art in technology.

According to the present invention, the primary reformer is equipped with feeder facilities for gas 6, which terminate at the entrance of the firing chamber 1 into the flue gas tunnels. Consequently, the additional gas conducted into flue gas tunnels 4 passes entirely through them and can thus be brought to a temperature that is homogeneous to the temperature of the flue gas before this stream encounters heat exchangers and is utilized, for example, to preheat the gas to be reformed and/or the air utilized for heating.

Figure 2:
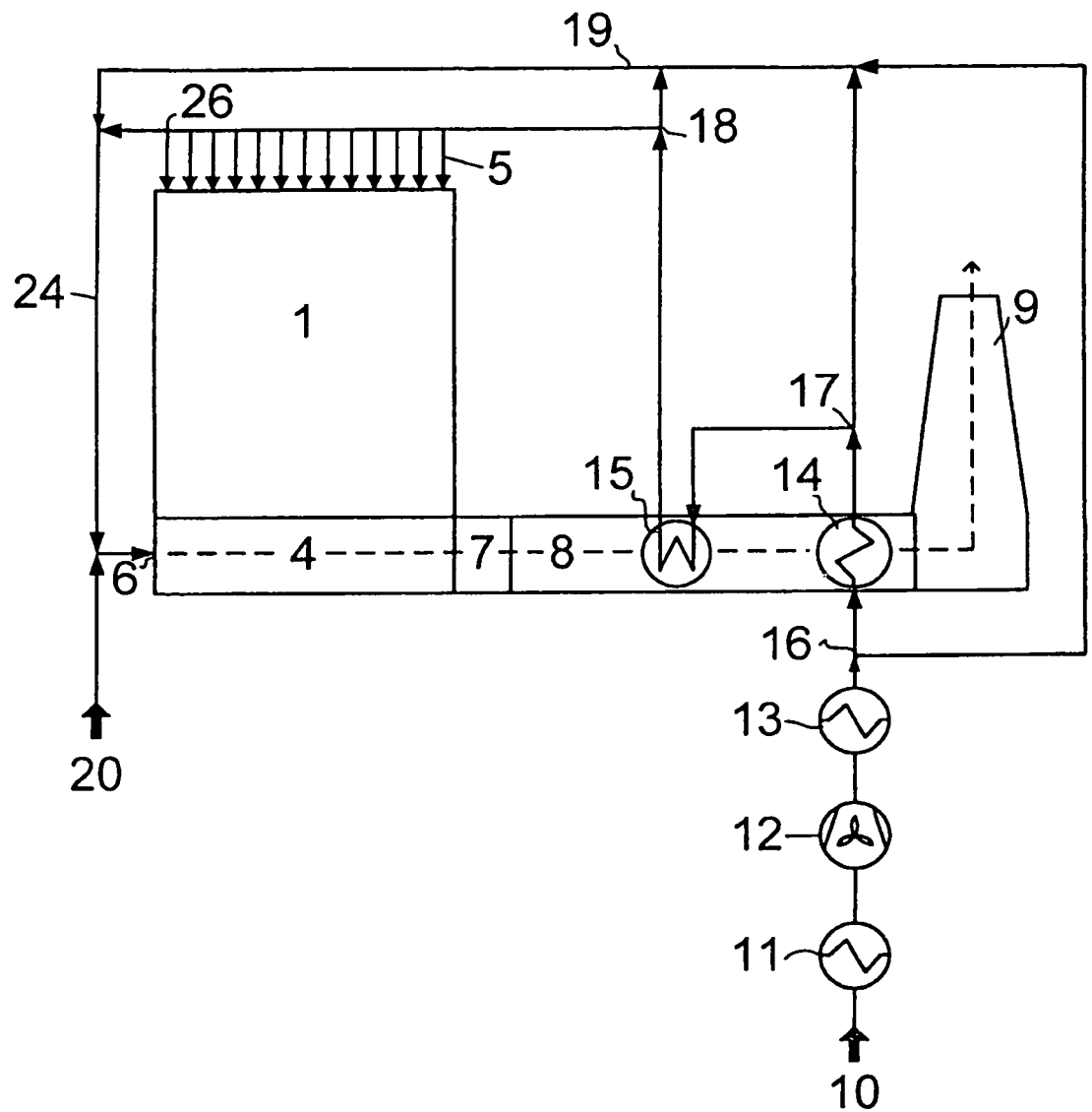
FIG. 2: shows a process diagram with an advantageous feeding method of additional gas
Figure 3:
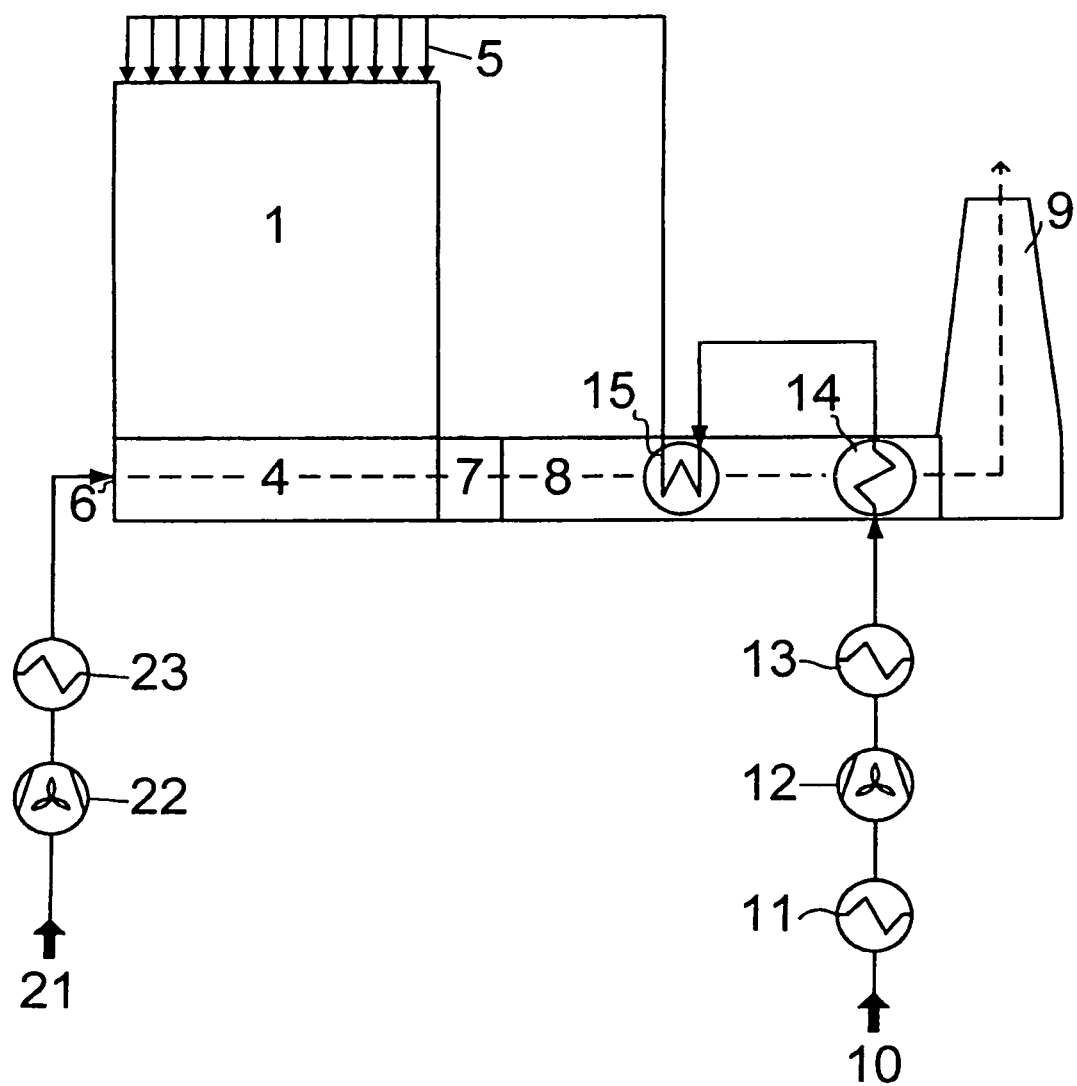
FIG. 3: shows a further process diagram with another advantageous feeding method of additional gas

FIGS. 2 and 3 illustrate schematically a firing chamber 1 with oven box, the flue gas tunnels 4, which are located below, a collecting means, and the flue gas pipe 8 leading to the stack 9, additionally the stream of the preheating of the air and of the flue gases (broken line).

In FIG. 10 ambient air 10 is fed to and being slightly preheated by the first air preheater 11. After that it is conveyed by the air blower 12 into the second preheater 13, where the air is further preheated by heat exchangers 14 and 15, both being located inside the flue gas pipe 8, there being heated to a temperature which is suitable for the operation of burners 3 (not shown in FIG. 2, see FIG. 1) of the primary reformer. From this air for burners 3 the additional gas is drawn off. For that branch the branch locations 16 after or before the second air preheater 13, the branch location 17 after heat exchanger 14, and branch location 18 after heat exchanger 15 can be used, alternatively. Further it is possible to draw off the additional gas directly after the feeding location of the burners 3 at the branch 26 and convey the additional gas via extension pipes 24 to the means of feeder facilities 6. The preheated additional gas 19 is mixed with contaminated gas 20 and fed into flue gas tunnel 4. There it reduces the nitrogen oxides according to the invention. The flue gas drawn off from flue gas tunnels 4 is collected in collection means 7 and conveyed through flue gas pipe 8 to the stack 9.

In FIG. 3 ambient air 10 is fed to and being slightly preheated by the first air preheater 11 the same way. After that it is conveyed by the air blower 12 into the second preheater 13, where the air is further preheated by heat exchangers 14 and 15, both being located inside the flue gas pipe 8, there being heated to a temperature which is suitable for the operation of burners 3 of the primary reformer. The additional gas 21 is not drawn of from this stream but comes from a different source. It is conveyed by air blower 22 into preheater 23 and preheated there before being conveyed into the flue gas channels 4.

It is clear that this additional gas can be preheated in additional heating devices within the flue gas pipe. Besides that the process and method alternatives shown in FIGS. 2 and 3 can be used not only as alternatives but also in addition to each other. The invention is hereinafter explained in detail on the basis of an exemplary embodiment.

Figure 4:
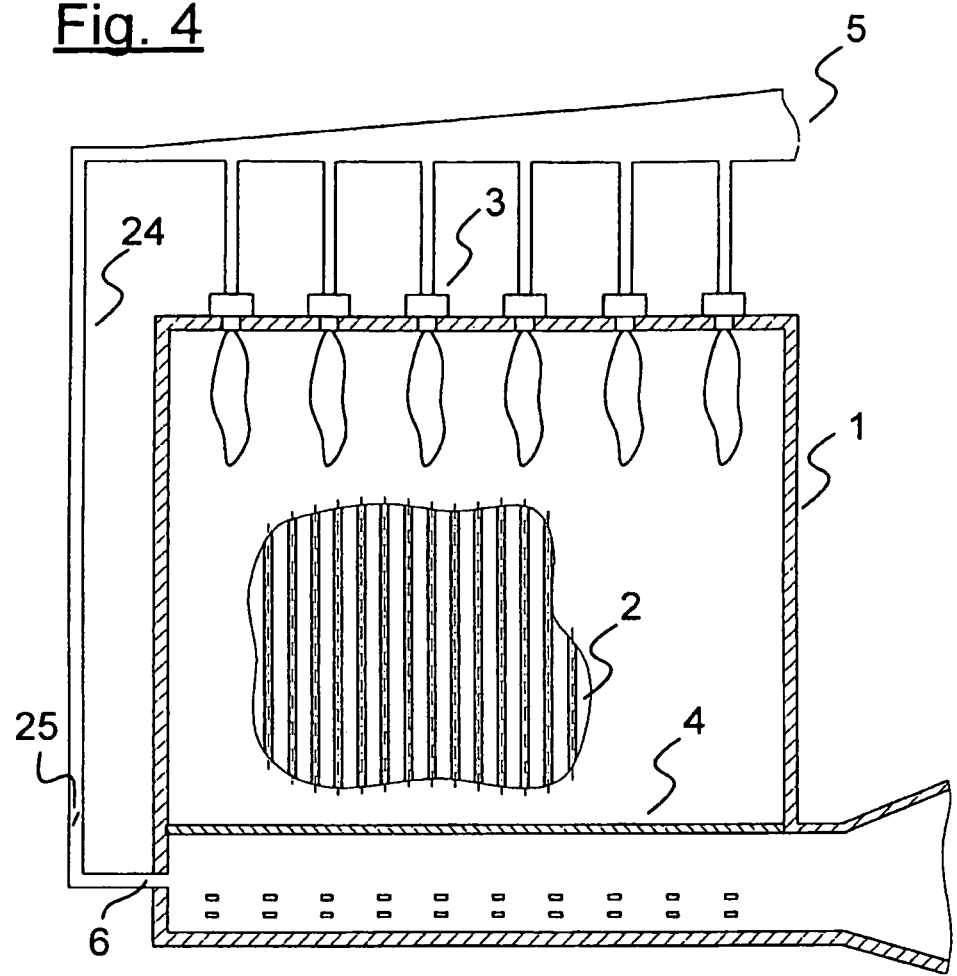
FIG. 4 shows a longitudinal section of an inventive embodiment of a primary reformer
Figure 5:
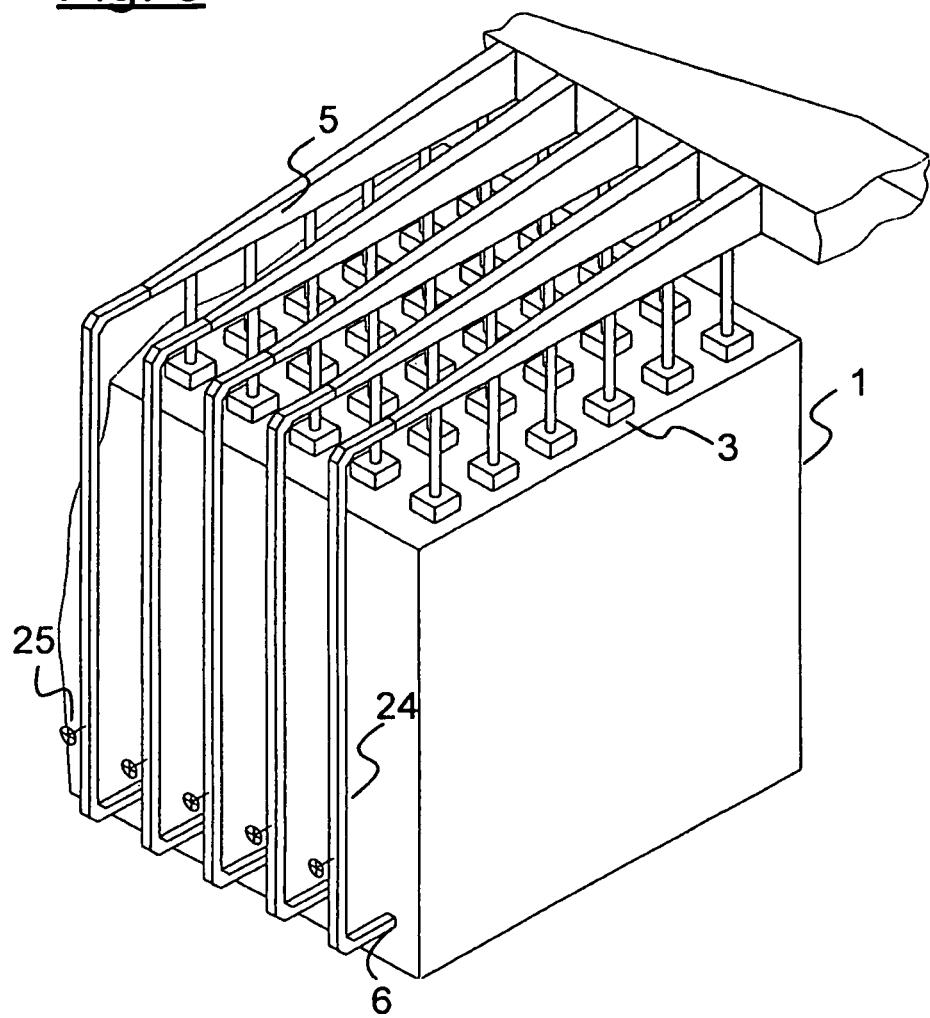
FIG. 5 shows an exterior view of an inventive embodiment of a primary reformer.

FIGS. 4 and 5 illustrate a special embodiment, where the primary reformer is equipped with feeder devices 5 for air, which have extensions 24 which connect to the feeder facilities for gas 6 into the flue gas tunnels 4 of the firing chamber 1. From that a possibility of regulation is seen, and it is ensured that under certain operating conditions such as partial load mode of such a primary reformer, the Lambda value at the burners and the flue gas volume are adjusted and set independently of each other, thus minimizing both the formation of nitric oxides in the firing chamber and optimizing the transfer of heat to the heat exchangers located downstream of the reformers. This is an essential benefit versus prior art in technology in which a heat transfer to other media under certain operating conditions such as partial load mode leads to increased nitric oxide emissions. It means the air contained in feeder facilities 5 which is still existing in the feeder facilities 5 after an optimal Lambda value has been adjusted and set at the individual burners is passed on into the flue gas tunnels 4, thus achieving a reduction in nitric oxide formation in the flue gas in addition to the optimal heat transfer.

According to prior art in technology, when changing the feedstock gas for reforming, the flue gas volume in a plant for production of synthesis gas must be enhanced by raising the air surplus from a Lambda value 1.1 to a Lambda value 1.25. According to test results, this leads to an increase of nitric oxide emissions at the burners by 30% from 24 ppm to 34 ppm. It is a dry flue gas having an oxygen content of 3%. Now, if only 88% of the combustion air is supplied through the feeder facilities 5 to the burners 3 and if the remaining 12% is passed to the flue gas tunnels 4, then a Lambda value of 1.1 is again obtained at the burners 3, and the nitric oxide emission again drops to 24 ppm, although the flue gas volume fed to the heat exchangers located further downstream has been raised to suit operational requirements of the overall plant. By that a measuring device for difference measurement between air and additional air comes into operation in order to ensure that the share of oxygen is known and the desired operating conditions in the plant can be achieved.

Benefits resulting from the invention:
  A process that is easy to integrate into existing industrial plants.
  Optimal heat exploitation of energy contained in flue gas in partial load mode is ensured.
  Application of actually established methods and processes.
  Reduction of nitric oxide formation and thus higher ecological compatibility.
  Costly treatment of waste gas streams laden with nitric oxides is no longer necessary, thus making the plant a more economic and profitable plant.

LIST OF REFERENCE NUMBERS

1 Firing chamber
2 Split tubes
3 Burner
4 Flue gas tunnel
5 Feeder facilities for air
6 Additional air
7 Collecting means
8 Flue gas pipe
9 Stack
10 Ambient air
11 First air preheater
12 Air blower
13 Second air preheater
14 Heat exchanger
15 Heat exchanger
16 Branch
17 Branch
18 Branch
19 Preheated additional gas
20 Contaminated gas
21 Additional gas
22 Air blower
23 Preheater
24 Extension
25 Regulation device
26 Branch

The invention claimed is:

1. An energy efficient heat recovery reactor system for use in the catalytic primary reformation of hydrocarbons, the reactor system comprising:
    a firing chamber having a substantially closed internal space;
    a plurality of vertical tubes arranged in parallel rows within the internal space of said firing chamber and configured as hydrocarbon reformation reaction chambers that discharge reformed synthesis gas therefrom;
    a plurality of burners disposed within the internal space of said firing chamber at an upper end thereof, said burners being arranged in parallel to each other and disposed between each of said rows of vertical tubes, and configured to generate flames for heating said vertical tubes;
    a plurality of burner air feeders in at least one of gaseous or fluid communication with said plurality of burners, configured to supply air to said plurality of burners for combustion by said burners in said firing chamber;
    a plurality of flue gas tunnels disposed at a lower end of said firing chamber and extending in parallel to each other and perpendicular to said vertical tubes, each flue gas tunnel defining a length, and having
        (a) a plurality of lateral walls defining an interior space, an open first end, an open second end opposite the open first end, and a flue gas flow direction along the length of said flue gas tunnel from said first end to said second end, and
        (b) at least one aperture defined in at least one of the plurality of lateral walls for each of said flue gas tunnels, so as to permit passage of flue gas between said firing chamber and said flue gas tunnel,
        said flue gas tunnels being configured to exhaust hot flue gasses from said firing chamber through the at least one aperture to an interior of said flue gas tunnels, along the length of said flue gas tunnels in the flue gas flow direction, and out the second open ends of said flue gas tunnels;
    at least one heat exchanger in gaseous communication with, and downstream from, said open second end of said flue gas tunnel, said heat exchanger configured to permit hot flue gasses to pass there through to recover heat from the hot flue gasses; and
    a plurality of controllable cooling gas feeders disposed at, and in gaseous communication with, the open first end of said flue gas tunnels, said cooling gas feeders configured to feed an additional gas, cooler than the hot flue gas, into said flue gas tunnels and increase a total volume of mixed flue gas passing to said heat exchanger such that the additional gas mixes with the hot flue gas over the entire length of the flue gas tunnels and firing chamber, to effect a controlled reduction in temperature of the hot flue gas exiting the second end of the flue gas tunnels and entering the at least one heat exchanger, with a resulting homogeneous temperature distribution at an entrance to the heat exchanger, whereby all points in a cross section of the mixed flue gas flow stream at the entrance to the heat exchanger have a substantially identical reduced temperature.

2. The energy efficient heat recovery reactor system of claim 1, wherein said plurality of cooling gas feeders for feeding an additional gas into the flue gas tunnels are bypass lines in gaseous communication with said burner air feeders and are configured to split off the supply air from said burner air feeders that supply air to said plurality of burners, and controllably channel a portion of the burner supply air to the open first end of the flue gas tunnel and feed the channeled air into the flue gas tunnel as the additional gas fed to the flue gas tunnel.

3. An energy efficient heat recovery reactor system for use in the catalytic primary reformation of hydrocarbons, the reactor system comprising:
    a firing chamber having a substantially closed internal space;
    a plurality of vertical tubes arranged in parallel rows within the internal space of said firing chamber and configured as hydrocarbon reformation reaction chambers that discharge reformed synthesis gas therefrom;
    a plurality of burners disposed within the internal space of said firing chamber at an upper end thereof, said burners being arranged in parallel to each other and disposed between each of said rows of vertical tubes, and configured to generate flames for heating said vertical tubes;
    a plurality of flue gas tunnels disposed at a lower end of said firing chamber and extending in parallel to each other and perpendicular to said vertical tubes, each flue gas tunnel defining a length, and having
        (a) a plurality of lateral walls defining an interior space, an open first end, an open second end opposite the open first end, and a flue gas flow direction along the length of said flue gas tunnel from said first end to said second end, and
        (b) at least one aperture defined in at least one of the plurality of lateral walls for each of said flue gas tunnels, so as to permit passage of flue gas between said firing chamber and said flue gas tunnel,
        said flue gas tunnels being configured to exhaust hot flue gasses from said firing chamber through the at least one aperture to an interior of said flue gas tunnels, along the length of said flue gas tunnels in the flue gas flow direction, and out the second open ends of said flue gas tunnels;
    at least one heat exchanger in gaseous communication with, and downstream from, said open second end of said flue gas tunnel, said heat exchanger configured to permit hot flue gasses to pass there through to recover heat from the hot flue gasses; and
    a plurality of controllable cooling gas feeders disposed at and in gaseous communication with the open first end of said flue gas tunnels, said cooling gas feeders configured to feed an additional gas, cooler than the hot flue gas, into said flue gas tunnels and increase a total volume of mixed flue gas passing to said heat exchanger such that the additional gas mixes with the hot flue gas over the entire length of the flue gas tunnels and firing chamber, to effect a controlled reduction in temperature of the hot flue gas exiting the second end of the flue gas tunnels and entering the at least one heat exchanger, with a resulting homogenous temperature distribution at an entrance to the heat exchanger, whereby all points in a cross section of the mixed flue gas flow stream at the entrance to the heat exchanger have a substantially identical reduced temperature.

4. The energy efficient heat recovery reactor system of claim 3, further comprising:
    a plurality of burner air feeders devices in at least one of gaseous or fluid communication with said plurality of burners, configured to supply air to said plurality of burners for combustion by said burners in said firing chamber.

5. The energy efficient heat recovery reactor system of claim 4, wherein said plurality of cooling gas feeders for feeding an additional gas into the flue gas tunnels are bypass lines in gaseous communication with said burner air feeders, the bypass line being configured to split off the supply air from said burner air feeders and controllably channel a portion of the burner supply air to the open first ends of the flue gas tunnels and feed the channeled air into the flue gas tunnels as the additional cooling gas fed to the flue gas tunnels.

6. An energy efficient heat recovery reactor system for use in the catalytic primary reformation of hydrocarbons, the reactor system comprising:
- a firing chamber having a substantially closed internal space;
- at least one vertical tube disposed within the internal space of said firing chamber and configured as a hydrocarbon reformation reaction chamber that discharges reformed synthesis gas therefrom;
- at least one burner disposed within the internal space of said firing chamber at an upper end thereof, said burner being disposed adjacent said at least one vertical tube, and configured to generate a flame for heating said vertical tube;
- at least one flue gas tunnel disposed at a lower end of said firing chamber and extending perpendicular to said at least one vertical tube, said at least on flue gas tunnel defining a length, and having
  (a) a plurality of lateral walls defining an interior space, an open first end, an open second end opposite the open first end, and a flue gas flow direction along the length of said flue gas tunnel from said first end to said second end, and
  (b) at least one aperture defined in at least one of the plurality of lateral walls of said at least one flue gas tunnel, so as to permit passage of flue gas between said firing chamber and said flue gas tunnel,
  said flue gas tunnel being configured to exhaust hot flue gasses from said firing chamber through the at least one aperture to an interior of said flue gas tunnel, along the length of said flue gas tunnel in the flue gas flow direction, and out the second open end of said flue gas tunnel;
- at least one heat exchanger in gaseous communication with, and downstream from, said open second end of said flue gas tunnel, said heat exchanger configured to permit hot flue gasses to pass there through to recover heat from the hot flue gasses; and
- at least one controllable cooling gas feeder disposed at and in gaseous communication with the open first end of said at least one flue gas tunnel, said at least one cooling gas feeder configured to feed an additional gas, cooler than the hot flue gas, into said at least one flue gas tunnel and increase a total volume of mixed flue gas passing to said heat exchanger, such that the additional gas mixes with the hot flue gas over the entire length of the flue gas tunnel and firing chamber, to effect a controlled reduction in temperature of the hot flue gas exiting the second end of the flue gas tunnel and entering the at least one heat exchanger, with a resulting homogenous temperature distribution at an entrance to the heat exchanger, whereby all points in a cross section of the mixed flue gas flow stream at the entrance to the heat exchanger have a substantially identical reduced temperature.

* * * * *